United States Patent [19]

Trumpp et al.

[11] Patent Number: 5,159,330

[45] Date of Patent: Oct. 27, 1992

[54] BROADBAND SIGNAL SWITCHING EQUIPMENT CONSTRUCTED IN ACCORDANCE WITH FIELD-EFFECT TRANSISTOR TECHNOLOGY

[75] Inventors: Gerhard Trumpp, Puchheim; Jan Wolkenhauer, Munich, both of Fed. Rep. of Germany

[73] Assignee: Siemens Aktiengesellschaft, Munich, Fed. Rep. of Germany

[21] Appl. No.: 580,485

[22] Filed: Sep. 11, 1990

[30] Foreign Application Priority Data

Sep. 11, 1989 [EP] European Pat. Off. ........ 89116806.4

[51] Int. Cl.$^5$ ............................................. H04B 1/00
[52] U.S. Cl. ........................... 340/825.91; 340/825.85; 340/825.9
[58] Field of Search ............... 340/825.85, 825.86, 340/825.87, 825.89, 825.9, 825.91; 379/291, 292; 307/468, 571, 576

[56] References Cited

U.S. PATENT DOCUMENTS

| | | | |
|---|---|---|---|
| 4,801,936 | 1/1989 | Hoffmann | 340/825.85 |
| 4,894,651 | 1/1990 | Trumpp et al. | 340/825.91 |
| 4,949,086 | 8/1990 | Hofmann | 340/825.91 |
| 5,073,775 | 12/1991 | Hofmann | 340/825.79 |

FOREIGN PATENT DOCUMENTS

| | | |
|---|---|---|
| 0103236 | 3/1984 | European Pat. Off. |
| 0219701 | 4/1987 | European Pat. Off. |
| 0262479 | 4/1988 | European Pat. Off. |
| 59-131221 | 7/1984 | Japan |
| 60-139020 | 7/1985 | Japan |

*Primary Examiner*—Donald J. Yusko
*Assistant Examiner*—Dervis Magistre
*Attorney, Agent, or Firm*—Hill, Van Santen, Steadman & Simpson

[57] ABSTRACT

A crosspoint matrix is constructed in accordance with FET technology and includes matrix input lines which lead to matrix output lines at respective crosspoints, which matrix output lines each comprise, respectively, two signal conductors and having two signal inputs of a differential amplifier to which the two signal conductors of each matrix output line are respectively connectible via a pre-charging transistor to a respective terminal of the operating voltage source, the signal conductors of each matrix output line being respectively connectible to another terminal of the operating voltage source via a respective coupling element that is formed with the series circuit of an input transistor that has its control electrode connected to the sole signal conductor of the appertaining matrix input line and that is further formed by a switching transistor that has its control electrode charged with a through-connect signal or, respectively, an inhibit signal.

9 Claims, 4 Drawing Sheets

BROADBAND SIGNAL SWITCHING EQUIPMENT CONSTRUCTED IN ACCORDANCE WITH FIELD-EFFECT TRANSISTOR TECHNOLOGY

BACKGROUND OF THE INVENTION

1. Field of the Invention

The present invention relates to broadband signal switching equipment and is particularly concerned with broadband signal switching equipment comprising a crosspoint matrix constructed in accordance with field-effect transistor (FET) technology.

2. Description of the Prior Art

If emitter-coupled logic (ECL) technology can be characterized by properties such as high working speed, minimum-to-high packing density and medium-to-high power dissipation, then field-effect transistor (FET) technology, given, however, only medium working speeds in comparison thereto, is distinguished by extremely-high packing density and very low power dissipation. These latter properties lead to the efforts to advance into speed regions with integrated circuits in FET technology that were heretofore reserved for bipolar technology.

For a broadband signal switching equipment having a crosspoint matrix that comprises respective matrix input lines formed with two signal conductors which, on the one hand, are respectively connected to two difference (complementary) outputs of an input digital signal circuit and, on the other hand, are connectible via crosspoints to matrix lines that are likewise respectively formed with two signal conductors that respectively have their two signal conductors leading to the two signal inputs of an output amplifier circuit formed with a differential amplifier, a crosspoint matrix constructed in accordance with FET technology, respectively having pairs of coupling elements provided in the crosspoints and formed with respectively two switching transistors charged with a through-connect signal or, respectively, an inhibit signal at their control electrodes is known in this context, for example from the European application 0 264 046 whose switching transistors respectively have the main electrode connected to the one signal conductor or, respectively, to the other signal conductor of the appertaining matrix output line that is, in turn, provided with an output differential amplifier having a trigger behavior, whereby the pairs of coupling elements respectively comprise two auxiliary transistors that each respectively form a series circuit with a switching transistor, these auxiliary transistors respectively having their control electrodes connected to the one signal conductor or, respectively, to the other signal conductor of the appertaining matrix input line and the respective main electrodes facing away from the series circuits connected via a sampling transistor to the one terminal (ground) of the operating voltage source and having their other main terminal connected to each signal conductor of the respective matrix output line via a respective pre-charging transistor, and whereby the pre-charging transistors and sampling transistors have their respective control electrodes charged opposite to one another when a switching matrix network drive clock that sub-divides a bit through-connect time interval into a pre-charging phase and into the actual through-connect phase, so that both signal conductors of the matrix output line in each preliminary phase given an inhibited sampling transistor are charged via the respective pre-charging transistor at least approximately to the potential prevailing at the mentioned, other terminal of the operating voltage source.

In addition to the advantages that are involved in a crosspoint matrix constructed in accordance with FET technology, this known broadband signal switching equipment produces the further advantage that, given an inhibited crosspoint, no disturbing signals, on the one hand, proceed via the crosspoint to the matrix output even without additional attenuation measures and that, on the other hand, given a conductive crosspoint, charge reversals of the matrix output line that may potentially occur in the actual bit through-connect condition always proceed from the one operating potential corresponding to the one signal state in only one charge reversal direction and, therefore, an unambiguous transition of the through-connected digital signal appearing at the output of the switching equipment from the one into the other signal state already occurs with a small charge reversal (corresponding to the transgression of a threshold adjacent to this value of an operating potential and corresponding to the break-over point of the differential amplifier), and, therefore, correspondingly fast.

A further enhancement of the operating speed in such a broadband signal switching equipment can be enabled in that the two pre-charging transistors have their main electrodes that respectively face toward the matrix output line connected to one another via a transverse transistor whose control electrode is connected to the control electrodes of the pre-charging transistors, as in the German patent 38 19 491; in combination with the advantage of accelerating the pre-charging of the matrix output lines, this yields the further advantage of an extremely-early balancing of the potential of the matrix output lines, so that the starting conditions for a reliable amplification by a following differential amplifier are established correspondingly early.

A further enhancement in the working speed of the broadband signal switching equipment is obtained when, in addition to a sampling transistor individually associated to the matrix input line, a pre-charging transistor individually associated to the matrix input line is provided or, alternatively, a pre-charging transistor individually associated to the matrix output line is provided in addition to a sampling transistor individually associated to the matrix output line in accordance with the German patent 38 19 491.

The advantages of such a known broadband switching equipment that can be obtained in view of dissipated power consumption and operating speed, this broadband switching equipment respectively comprising matrix input lines formed with two signal conductors, are involved with a corresponding space requirement for such respectively two signal conductors of the matrix input lines.

SUMMARY OF THE INVENTION

The object of the present invention is to provide a broadband signal switching equipment constructed in accordance with FET technology that has a noticeably-reduced space requirement in comparison to the broadband signal switching equipment known in the art.

A broadband signal switching equipment has already been proposed in this context comprising a crosspoint matrix in FET technology (see German patent 39 09 550.9) whose matrix input lines are connectible, via crosspoints respectively formed with pairs of coupling elements, to matrix output lines respectively formed with two signal conductors at whose two signal conductors the two signal inputs of an operational amplifier circuit formed with a differential amplifier having a trigger behavior are respectively connectible, whereby the pairs of coupling elements are respectively formed with two switching transistors that have their respective control electrodes charged with a through-connect signal or, respectively, an inhibit signal and have a main electrode connected to the one or, respectively, to the other signal conductor of the appertaining matrix output line and are respectively formed with two auxiliary transistors that respectively form a series circuit with a switching transistor, the auxiliary transistors respectively having their control electrode connected to a signal conductor of the appertaining matrix input line and having their respective main electrode facing away from the series circuit connected to a terminal of the operating voltage source via a sampling transistor individually associated to the coupling element, to a matrix input line or to an matrix output line, each signal conductor of the respective matrix output line being respectively connected to the other terminal of the operating voltage source via a pre-charging transistor, whereby pre-charging transistors and sampling transistors have their respective control electrodes oppositely charged with a switching matrix network drive clock that sub-divides a bit through-connect time interval into a pre-charging phase and into the actual through-connect phase, so that both signal conductors of the matrix output line, in each preliminary phase given an inhibited sampling transistor, are charged via the respective pre-charging transistor to at least approximately the potential prevailing at the mentioned, other terminal of the operating voltage source, and whereby the two pre-charging transistors have their main electrodes facing toward the respective matrix output line connected to one another via a transverse transistor whose control electrode is connected to the control electrodes of the pre-charging transistors; this broadband signal switching equipment being particularly characterized, according to the invention, in that the pairs of coupling elements each respectively comprise two auxiliary transistors of different channel types that have their control electrodes connected to one and the same signal conductor of the appertaining matrix input line.

The present invention proposes a different solution in comparison thereto. The present invention is directed to a broadband signal switching equipment comprising a crosspoint matrix constructed in accordance with FET technology whose matrix input lines each respectively formed with a signal conductor are connectible via crosspoints each respectively formed with coupling elements to matrix output lines each respectively formed with two signal conductors and to whose signal conductors the two signal inputs of an output amplifier circuit formed with a differential amplifier are respectively connected, whereby the coupling elements are respectively formed with a switching transistor that is charged with a through-connect or, respectively, inhibit signal that has a main electrode connected to the one or, respectively, to the other signal conductor of the appertaining matrix line and are respectively formed with an input transistor that forms a series circuit with the switching transistor, the input transistor having its control electrode connected to the signal conductor of the appertaining matrix input line and having its main electrode that faces away from the series circuit connected to a terminal of the operating voltage source, and whereby the signal conductors of the respective matrix output line are respectively connectible to a respective terminal of the operating voltage source via a pre-charging transistor that has its control electrode charged with a clock signal that sub-divides a bit through-connect time interval into a pre-charging phase and into an actual through-connect phase, so that, in each pre-charging phase, the signal conductors of the matrix output line are chargeable via the respective pre-charging transistors to a pre-charging potential lying between the potentials of the operating voltage source or, on the other hand, to one of the operating voltage source potentials. This broadband signal switching equipment, according to the present invention, is characterized in that the main electrode facing away from the series circuit in the input transistor of the coupling element connected to a signal conductor is connectible to the terminal of the operating voltage source that has high potential and the main electrode facing away from the series circuit in the input transistor of the coupling element connected to the other signal conductor is connectible to the terminal of the operating voltage source that has the low potential.

The present invention provides the advantage of requiring only a single signal conductor per matrix input line, with a correspondingly-reduced space requirement and reduced power consumption; but of simultaneously retaining the other characteristics and advantageous properties of the initially-mentioned, known broadband switching equipment.

In the broadband signal switching equipment according to the present invention, a change of the state of potential on the signal conductors of the appertaining matrix output line only arises given the through-connection of the one signal state, whereby the potentials change in opposite directions on the other signal conductors, so that a difference in potential required for a reliable output decision is more quickly reached and, therefore, a higher transmission rate is enabled. Since respectively only those matrix output lines must be re-charged with the pre-charging phase that experienced a change in the state of their potential in the preceding, main phase, another reduction of the power consumption compared to the known broadband signal equipment results. In that, first of all, a charging of the one signal conductor and, in the following pre-charging phase, a charging of the other signal conductor occurs given the through-connection of the one signal state wherein a change in the status of the potential on the appertaining matrix output line occurs, this leads to an evening out of the power consumption from the supplying operating voltage source. The connection of the coupling elements to the operating voltage source can advantageously occur at the supply lines that are already provided in each crosspoint for the supply of the holding memory cells.

An especially simple manufacturability results when transistors of the same transistor type are utilized in the coupling elements.

An especially space-saving structure of the broadband signal switching equipment is achieved when transistors of the n-channel type are utilized in the coupling elements.

Alternatively to the above embodiment, however, the switching transistor of the one coupling element that is connected to that terminal of the operating voltage source having the higher potential can be of the p-channel type, in contrast whereto the remaining transistors of the coupling elements are of the n-channel type. The voltage drop at the activated coupling elements that are connected to that terminal of the operating voltage source having the higher potential becomes especially low on the basis of this meassure.

In accordance with a further development and feature of the invention, the mentioned one signal conductor of the respective matrix output line can be connected via the appertaining pre-charging transistor to that terminal of the operating voltage source having the low potential, in contrast whereto the other signal conductor of the respective matrix output line is connectible via the appertaining pre-charging transistor to that terminal of the operating voltage source having the high potential. As a result of these measures, the respective signal conductors of the matrix output lines can be charged to respectively different pre-charging potentials, so that the output amplifier circuits connected to the respective matrix output lines need not have any trigger characteristic in order, given non-switching of the coupling elements connected to the appertaining matrix output line, to remain in the basic condition assumed during the pre-charging phase in the main phase of the bit through-connect time interval.

In accordance with a further development and feature of the invention, transistors of the n channel type that have their control electrodes charged with the clock signal are utilized for the pre-charging transistors. In addition to the ease of manufacture and low space requirement, this measure yields the advantage that only one clock signal line is required for all pre-charging transistors.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
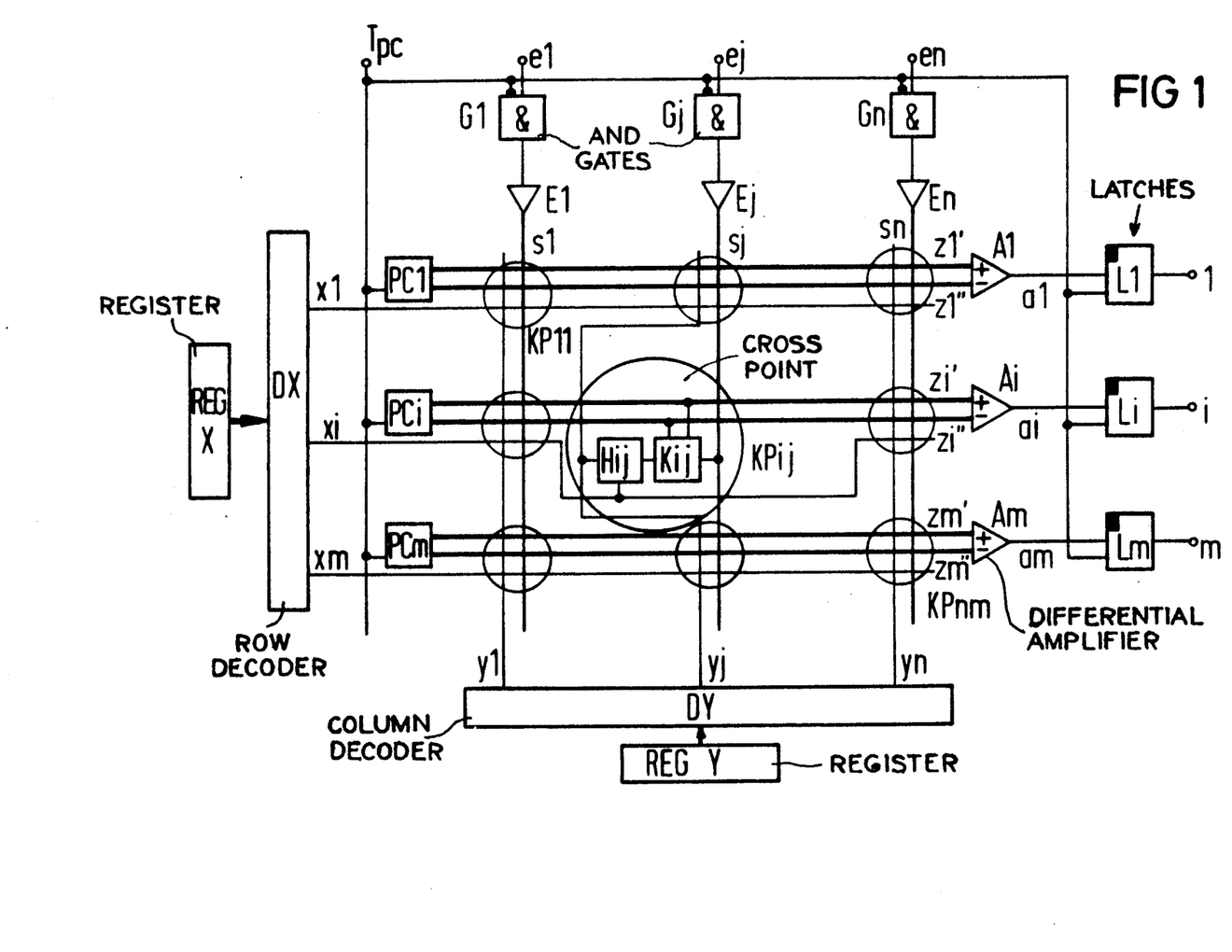
FIG. 1 is a schematic representation of a broadband signal switching equipment constructed in accordance with the present invention.

Referring to FIG. 1, a broadband signal switching equipment is schematically illustrated in a scope necessary for an understanding of the invention as comprising a plurality of inputs e1-en that lead to (matrix input lines) column lines s1-sn of a crosspoint matrix, a plurality of input driver circuit E1-En respectively connected to the inputs by way of a plurality of gates G1-Gn and a plurality of outputs a1-am reached by doubled (matrix output lines) row lines z1', z1''-zm',zm'' of the crosspoint matrix which are respectively connected to output driver circuits A1-Am each of which comprises a differential amplifier. The output a1-am lead to row-associated holding memories (latches) L1-Lm to which a clock signal $T_{PC}$ is supplied. The holding memories (latches) are notoriously known in the art and therefore need not be set forth in greater detail herein. The gates G1-Gn at the matrix input side can be established, as illustrated in FIG. 1, by gates realizing the logical AND function to which a clock signal $T_{PC}$ is supplied via an inverting input, the clock signal $T_{PC}$ likewise controlling the row-associated pre-charging circuits PC1-PCm, as set forth hereinbelow.

The crosspoint matrix comprises crosspoints KP11-KPnm whose coupling elements, as indicated in greater detail at the crosspoint KPij for the coupling element Kij thereof can be respectively controlled by a crosspoint-associated holding memory cell Hij (at the crosspoint KPij) whose output r is connected to the control input of the respective coupling element (Kij at the crosspoint KPij).

According to FIG. 1, the holding memory cells . . . , Hij . . . , are driven in two coordinates via corresponding selection lines x1-xm; y1-yn by two selection decoders, namely a row decoder DX and a column decoder DY. As may be seen from FIG. 1, let the two selection decoders DX, DY be respectively chargeable with a crosspoint row or, respectively, crosspoint column address shared in common by a matrix line (row or column) of crosspoints proceeding from input registers Reg X, Reg Y, in response whereto they respectively output a logical "1" selection signal to the selection line corresponding to the respective crosspoint line address. The coincidence of a row selection signal in the form of a logical "1" and of a column selection signal in the form of a logical "1" at the intersection of the appertaining matrix row with the appertaining matrix column when setting up a corresponding call then effects an activation of the holding memory cell located thereat, for example the memory cell Hij, with the consequence that the coupling element, the coupling element Kij in this example, controlled by the appertaining holding memory Hij becomes conductive.

So that the coupling element Kij under consideration in the present example, in turn, becomes inhibited given a cleardown of the appertaining call, the selection decoder DX is again charged with the appertaining row address by the input register Reg X, so that the row decoder DX again outputs a row selection signal in the form of a logical "1" on its output line xi; and, simultaneously, the column decoder DY is charged proceeding from its input register Reg Y with, for example, a dummy address or with the address of a column of unconnected crosspoints, so that it outputs a column selection signal in the form of logical "0" onto its output line yj; the coincidence of a row selection signal (a logical "1") and a column selection signal (a logical "0") then effects the resetting of the holding memory cell Hij, with the consequence that the coupling element Kij controlled thereby is inhibited.

Figure 4:
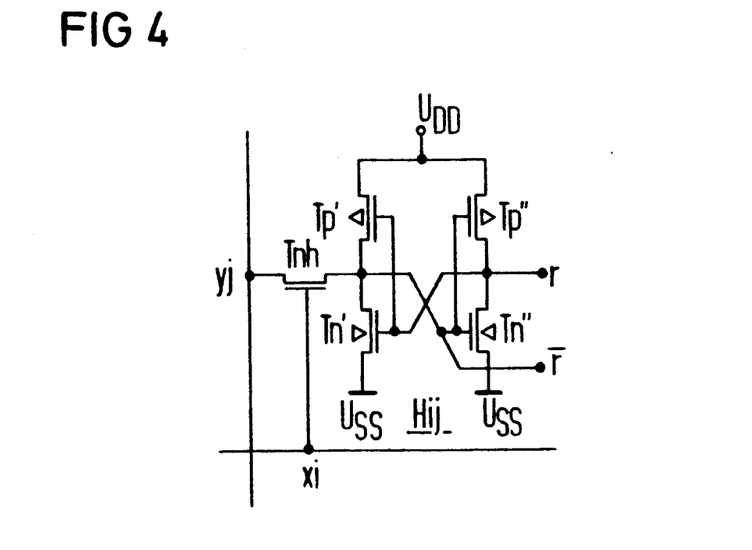
FIG. 4 is a schematic circuit diagram of a holding memory cell which may be employed in practicing the present invention.

The holding memory cells . . . Hij . . . can be constructed in a known manner; as known, for example, from the European patent 0 238 834 and as illustrated in FIG. 4, the holding memory cells can therefore be formed, for example, with an n-channel transistor Tnh and two cross-coupled inverter circuits (complementary-metal-oxide-semiconductor) (CMOS) inverter circuits Tp', Tn'; Tp", Tn" whereby one inverter circuit has its input side connected to the appertaining decoder output yj of the one selection decoder via the n-channel transistor Tnh that, in turn, has its control electrode charged with the output signal of the appertaining decoder output xi of the other selection decoder; and whereby one inverter circuit (Tp", Tn") outputs the through-connect signal or, respectively, the inhibit signal r at its output side, in contrast whereto the other inverter circuit (Tp', Tn') outputs the inverted through-connect or, respectively, inhibits signal r at its output side.

Figure 2:
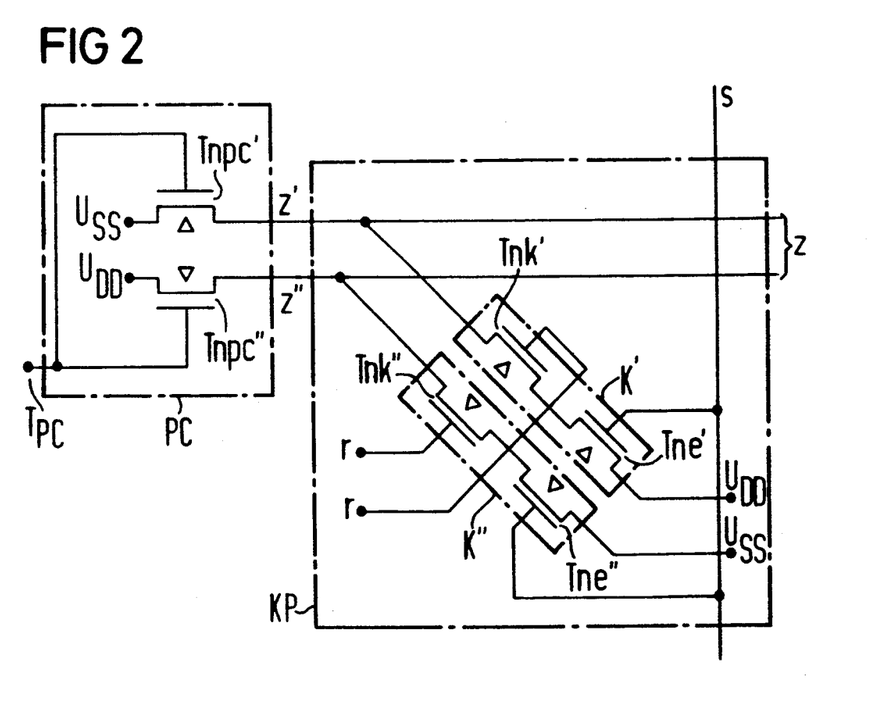
FIG. 2 is a schematic circuit diagram of an example of a matrix crosspoint used in practicing the present invention.
Figure 3:
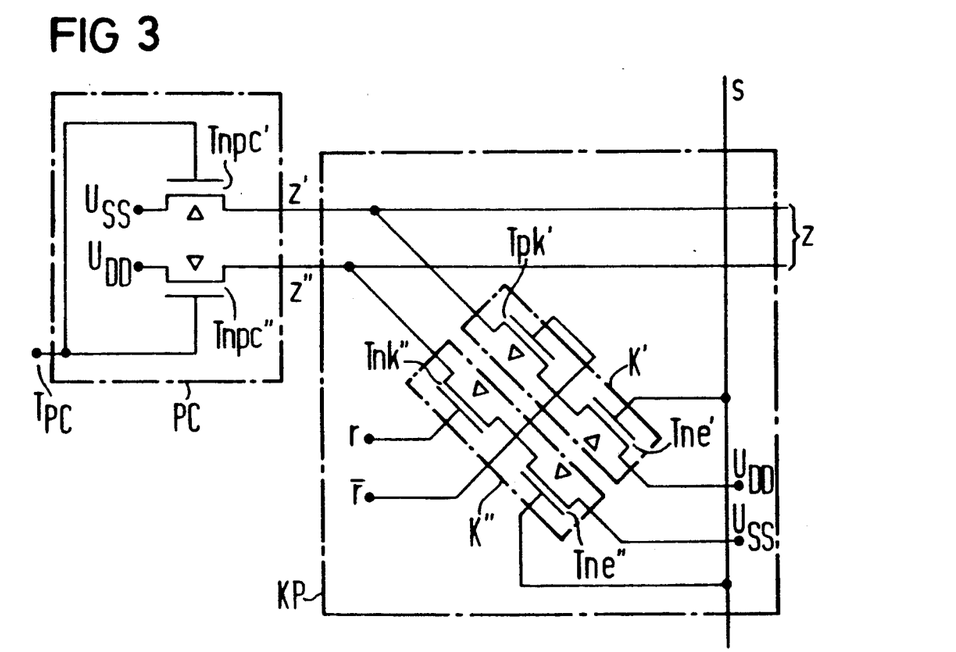
FIG. 3 is a schematic circuit diagram of another example of a crosspoint which may be used in practicing the present invention.

FIGS. 2 and 3 illustrate how the coupling elements K', K" can be realized in circuit-oriented terms; let the coupling elements K', K" of FIG. 2 be considered first. The coupling elements K', K" respectively form the switch transistor Tnk', Tnk" that respectively has its control electrode charged with a through-connect signal or, respectively, an inhibit signal r and has a main electrode connected to the one or, respectively, to the other signal conductor z',z" of the appertaining (matrix output line) row line z and respectively comprises an input transistor Tne' or, respectively, Tne" forming a series circuit with the switch transistor Tnk' or, respectively, Tnk", the input transistor Tne' or, respectively, Tne" having its respective control electrode connected to the appertaining (matrix input line) column line s and the main electrode thereof facing away from the series circuit being respectively connected to the one or, respectively, to the other terminal of the operating voltage source $U_{DD}$–$U_{SS}$. The transistors in the coupling elements K', K" of FIG. 2 are of the same channel type, preferably of the self-inhibiting n-channel type.

In accordance with FIG. 3, the embodiment of the coupling element K' of FIG. 2 can be modified to the effect such that a switch transistor Tpk' of the p-channel type is employed instead of the switch transistor Tnk" of the n channel type that, in series circuit connection with the input transistor Tne', forms the coupling element K' that has the main electrode facing away from the series circuit in the input transistor Tne' connected to that terminal $U_{DD}$ of the operating voltage source $U_{DD}$–$U_{SS}$ that has a higher potential. In order to be able to activate the switch transistor Tpk', it is driven with a through-connect signal r that is inverted in comparison to the through-connect signal r required for the switch transistor Tnk' (in FIG. 2), this inverted through-connect signal r being expediently taken from the junction of the transistors Tp', Tn' of the holding memory cell H (in FIG. 4). The signal conductors z', z" of the (matrix output lines) row lines z are connected to row-associated pre-charging circuit PC by way of which the signal conductor z', z" of the (matrix output lines) row lines z can be respectively charged to a pre-charging potential lying between the two operating potentials or to the operating potentials $V_{DD}$, $V_{SS}$. A pre-charging potential source for a pre-charging potential lying between the two operating potentials can be formed, in particular, in a fundamentally-known manner (for example as in the European patent 0 249 837) with a feedback complementary metal-oxide-semiconductor (CMOS) inverter by way of which the matrix output line is charged, in a respective pre-charging phase of a bit through-connect time interval, at least approximately to the potential corresponding to the switching threshold of the inverter.

In the exemplary embodiments illustrated in FIG. 2 and in FIG. 3, by contrast, the signal conductors z', z" of the (matrix output line) row line z are respectively connected via a pre-charging transistor Tnpc', Tnpc" of the self-inhibiting n-channel type to a respective different terminal of the operating voltage source $U_{DD}$–$U_{SS}$. The control electrodes of the pre-charging transistors Tnpc', Tnpc" are each respectively connected to a line that carries the clock signal $T_{PC}$.

The output driver circuits A1–Am in FIG. 1 can be established, for example, by differential amplifiers having a trigger behavior that each respectively realized with what is referred to as a gated flip-flop as is fundamentally known from the IEEE Journal of Solid-State Circuits, October, 1973, pp. 319-323, FIG. 6, and likewise already known in a variety of modifications (for example from the German published application 24 22 136, FIG. 3, and from the German published application 26 08 119, FIG. 5, whereby a balancing transistor provided in the first of these two citations is to be advantageously fashioned as a p-channel transistor just like the pre-charging transistors in the German published application 24 22 136 or, respectively, load transistors in the German published application 26 08 119.

When as shall be set forth in greater detail below, the signal conductors z', z" of the (matrix output lines) row lines z are respectively charged to at least approximately a different potential of the operating voltage source $U_{DD}$–$U_{SS}$ in the pre-charging phase pv, then a differential amplifier suffices as the output driver circuit A that, for example, can be constructed as an operational amplifier that is then preferably executed in accordance with FET technology.

The output driver circuits A1–Am, shown as differential amplifiers in FIG. 1, respectively have their non-inverting input (+) connected to the signal conductor z' and have their inverting input (−) connected to the signal conductor z" of the respective (matrix output line) row line z. Given this manner of connecting, the phase relation of the output signal a shown in FIG. 5, last line, is obtained.

Figure 5:
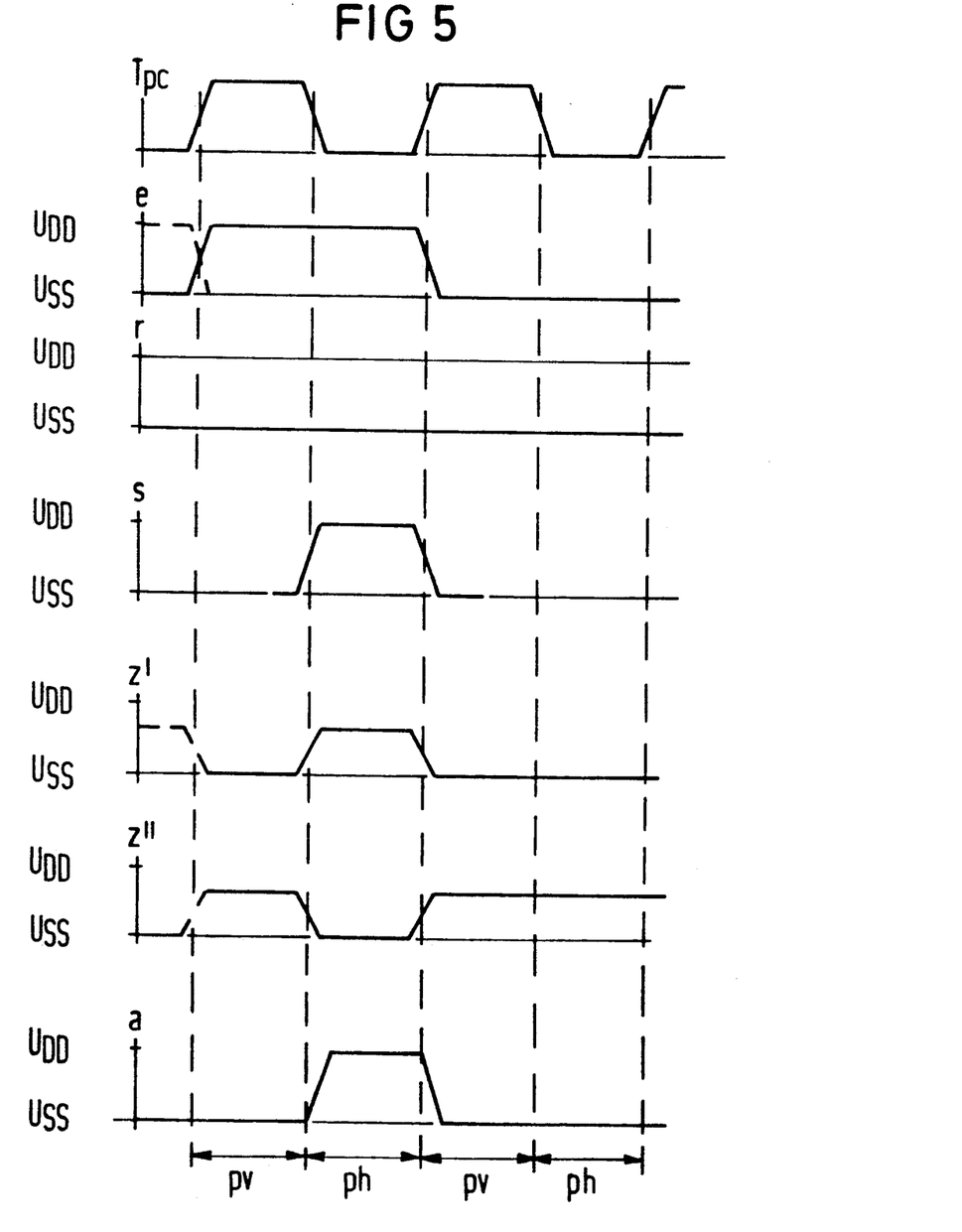
FIG. 5 is a timing diagram of signals occurring in a broadband signal switching equipment constructed in accordance with the present invention.

For two successive bit through-connect time intervals, FIG. 5 illustrates the transmission of a "HIGH" signal and, subsequently, of a "LOW" signal (see line e) from, for example, an input ej (in FIG. 1) to an output ai (in FIG. 1) of the crosspoint matrix of FIG. 1. What is effected on the basis of a corresponding clock signal TPC (line $T_{PC}$ in FIG. 5; a "HIGH" signal in the example) that charges the control electrodes each pre-charging transistor Tnpc', Tnpc" (in FIGS. 2 and 3) is that each pre-charging transistor Tnpc', Tnpc" is conductive in each pre-charging phase pv (in FIG. 5, bottom) of a bit through-connect interval sub-divided into such a pre-charging phase pv and into a following main phase ph (in FIG. 5, bottom), so that, during the pre-charging phase pv, the signal conductor z', z" of the (matrix output lines) row lines z are respectively charged to a potential lying between the operating potentials $U_{DD}$, $U_{SS}$ or to an operating potential $U_{DD}$, $U_{SS}$ itself. In the exemplary embodiments of FIGS. 2 and 3, the signal conductor z' of the respective (matrix output line) row line z are thus discharged during the pre-charging phase pv to the low potential ($U_{SS}$, ground) of the operating voltage source $U_{DD}$–$U_{SS}$ (see FIG. 5, line z'); in contrast whereto, the signal conductors z" of the respective (matrix output line) row line z are charged by the high potential $U_{DD}$ of the operating voltage source $U_{DD}$–$U_{SS}$ (see FIG. 5, line zz'). In that the pre-charging transistors Tnpc" work in a source-follower configuration with respect to the respective signal conductor z", the signal conductor z" are charged to a potential that, compared to the high potential $U_{DD}$ of the operating voltage $U_{DD}$–$U_{SS}$, is reduced by the threshold voltage between the control electrode and the main electrode of the respective pre-charging transistor Tnpc" connected to the signal conductor z".

In the main phase ph (see FIG. 5, bottom) following thereupon, the pre-charging transistors Tnpc', Tnpc" (FIG. 2 and FIG. 3) in the example are inhibited by a "LOW" clock signal $T_{PC}$ (see FIG. 5, line $T_{PC}$); simultaneously, the gate circuits G1–Gn (in FIG. 1) at the matrix input side are unlocked. As a result thereof, the signal applied at the input lines e1–en of the crosspoint matrix are through-connected via the respective input driver circuit E1–En onto the respective (matrix input lines) column lines s (see FIG. 5, line e, s). When a (matrix input line) column line s is in the "LOW" state, then all input transistors Tne', Tne" (in FIG. 2 or, respectively, in FIG. 3) connected to this column line s via their control electrode remain inhibited, in contrast whereto the aforementioned input transistors Tne', Tne" are placed into the conductive condition by a "HIGH" signal on the appertaining column line s.

Whe, due to a through-connect signal r (in FIG. 2, "HIGH" signal for the transistors Tnk' and Tnk"; in FIG. 3, "HIGH" signal for the transistors Tnk" and a "LOW" signal for the transistor Tpk') suitable for actuation of the switching transistors Tnk' or, respectively, Tpk', Tnk" that is applied at the respective control electrodes of the switching transistors Tnk', or, respectively, Tpk', Tnk", a crosspoint KP is in the through-connect state (see FIG. 5, line r) and the appertaining matrix input line) column line s carries a "HIGH" signal (see FIG. 5, line s), then the signal conductor z" of the appertaining (matrix output line) row line z is discharged to the low potential $U_{SS}$ of the operating voltage source $U_{DD}$–$U_{SS}$ (see FIG. 5, line z"). In contrast thereto, the signal conductor z' of the appertaining (matrix output line) row line g is charged by the high potential $U_{DD}$ is charged by the high potential $U_{DD}$ of the operating voltage source $U_{DD}$–$U_{SS}$ (see FIG. 5, line z'). In that the respective input transistors Tne' work in a source-follower circuit configuration with respect to the respective signal conductor z', the appertaining signal conductor z' is charged to a potential that, compared to the high potential $U_{DD}$ of the operating voltage $U_{DD}$–$U_{SS}$, is reduced at least by the threshold voltage between the control electrode and that main electrode of the appertaining input transistor Tne' that faces toward the series circuit of the input transistor Tne' and the switching transistor Tnk' or, respectively, Tpk'.

Due to the above-described charge reversal of the signal conductor z', z", a polarity reversal of the voltage difference occurs at the input of the output driver circuit A that is connected to the respective signal conductor z', z" of the (matrix output line) row line z under consideration, this polarity reversal of the voltage difference being intensified by the output driver circuit and leading to a steep signal change at the output of the output driver circuit A (see FIG. 5, line a). A signal applied at the appertaining (matrix input line) column line s is therefore through-connected with the same operational sign via the crosspoint KP respectively unlocked via the switching transistors Tnk' or, respectively, Tpk', Tnk" (see FIG. 5, lines s and a). At the end of the main phase ph, the "HIGH" signal (see FIG. 5, line a) available at the output a of the output driver circuit A is transferred into the appertaining holding memory (latch) L, for example with the signal change of the clock signal $T_{PC}$ that leads from the "LOW" state into the "HIGH" state. In the following bit through-connect time interval, let a "LOW" signal now be transmitted via the input line ej of FIG. 1 under consideration according to FIG. 5. In the pre-charging phase pv, all signal conductors z', z" of the (matrix output lines) row lines z are initially again pre-charged. In the following main phase ph, let the switching transistors Tnk' or, respectively, tpk', tnk" again be in the through-connect state. Since a "LOW" signal is applied at the input line ej (see FIG. 5, line e), the appertaining (matrix input line) column line sj likewise remains in the "LOW" state, with the consequence that all input transistors Tne', Tne" connected to this column line sj remain inhibited, the appertaining signal conductor z', z" of the (matrix output line) row line z are not charge-reversed and, therefore, the signal state is preserved on this output (see FIG. 5, line a), under the condition that no other crosspoint KP connected to this (matrix output line) row line z was activated; at the end of this main phase ph, a "LOW" signal is therefore transferred into the appertaining holding memory (latch) L.

As may be seen from FIG. 5, line z', z", the signal conductor z', z" of the (matrix output lines) row lines z work with a signal increase that is diminished in comparison to the operating voltage $U_{DD}$–$U_{SS}$, a reduction of the charge reversal losses on the (matrix output lines) row lines z resulting therefrom.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A broadband switching apparatus constructed in accordance with field-effect transistor technology, comprising:

an operating voltage source including a first, high voltage terminal and a second, low voltage terminal;

a crosspoint matrix including a plurality of matrix input lines arranged in columns, a plurality of matrix output lines arranged in rows crossing said columns and defining crosspoint locations at the crossings of said matrix input and output lines;

each of said matrix input lines comprising a single signal conductor and each of said matrix output lines comprising first and second signal conductors;

a plurality of crosspoint elements each connected between the respective matrix input and output lines at respective crosspoint locations;

each of said crosspoint elements comprising first and second coupling elements;

each of said coupling elements comprising a first field-effect transistor as a switching transistor including a source-drain path having first and second main electrodes, said first main electrode connected to a respective conductor of the respective matrix output line, and a control electrode for receiving a through-connect signal or an inhibit signal, and a second field-effect transistor as an input transistor including a source-drain path having first and second main electrodes, said first main electrode of said second field-effect transistor connected to said second main electrode of said first field-effect transistor and said second main electrode of said second field-effect transistor connected to a respective one of said voltage terminals, and a control electrode connected to the respective single signal conductor of the respective matrix input line;

said first main electrode of said first field-effect transistor of said first coupling element connected to said first signal conductor of the respective matrix output line and said first main electrode of said first field-effect transistor of said second coupling element connected to said second signal conductor of the respective matrix output line;

said second main electrode of said second field-effect transistor of said first coupling element connected to said first, high voltage terminal and said second main electrode of said second field-effect transistor of said second coupling element connected to said second, low voltage terminal;

a pre-charging circuit comprising third and fourth field-effect transistors as pre-charging transistors, each of said pre-charging transistors including a source-drain path having first and second main electrodes, and a control electrode; and said first main electrode of said third field-effect transistor connected to said first signal conductor of the respective matrix output line, said main electrode of said third field-effect transistor connected to said second, low voltage terminal, said first main electrode of said fourth field-effect transistor connected to said second signal conductor of the respective matrix output line, said second main electrode of said fourth field-effect transistor connected to said first high voltage terminal, and said control electrodes of said third and fourth field-effect transistors connected to receive clock signals which are effective to divide a bit through-connect time interval into a pre-charge phase and an actual through-connect phase so that said signal conductors of the respective matrix output line are chargeable via the respective pre-charging transistors in each pre-charging phase to a pre-charging potential lying between the potentials at the operating voltage source or to one of the operating potentials.

2. The broadband switching apparatus of claim 1, wherein:
said field-effect transistors of said coupling elements are of the same conductivity type.

3. The broadband switching apparatus of claim 1, wherein:
said field-effect transistor of said coupling elements are n-channel field-effect transistors.

4. The broadband switching apparatus of claim 1, wherein:
said first field-effect transistor of said first coupling element is a p-channel field-effect transistor and said first and second field-effect transistors of said second coupling element and said second field-effect transistor of said first coupling element are n-channel field-effect transistors.

5. The broadband switching apparatus of claim 1, wherein:
said third and fourth field-effect transistors are n-channel field-effect transistors.

6. The broadband switching apparatus of claim 1, and further comprising:
a plurality of output amplifiers each including an input connected to a respective matrix output line and an output.

7. The broadband switching apparatus of claim 1, and further comprising:
a plurality of output amplifiers each including a differential amplifier comprising first and second inputs respectively connected to said first and second signal conductors of a respective matrix output line, and an output.

8. The broadband switching apparatus of claim 7, and further comprising:
a plurality of latch circuits each including a first input connected to said output of a respective output amplifier, a second input for receiving said clock signals, and an output.

9. The broadband switching apparatus of claim 1, and further comprising:
a plurality of input terminals for receiving input data signals;
a plurality of AND gates each including a first input connected to a respective input terminal, and inverting second input connected to receive said clock signals, and an output; and
a plurality of input drivers each including an input connected to said output of a respective AND gate and an output connected to said single signal conductor of a respective matrix input line.

* * * * *